April 21, 1970   C. A. ANDERSEN ET AL   3,508,045
ANALYSIS BY BOMBARDMENT WITH CHEMICALLY REACTIVE IONS
Filed July 12, 1968                     4 Sheets-Sheet 1
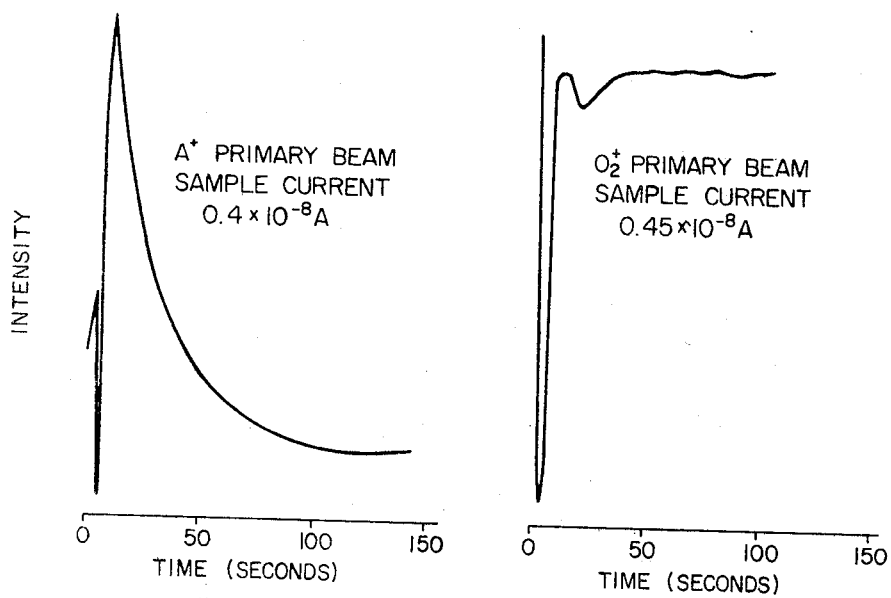
FIG. 1A
FIG. 1B
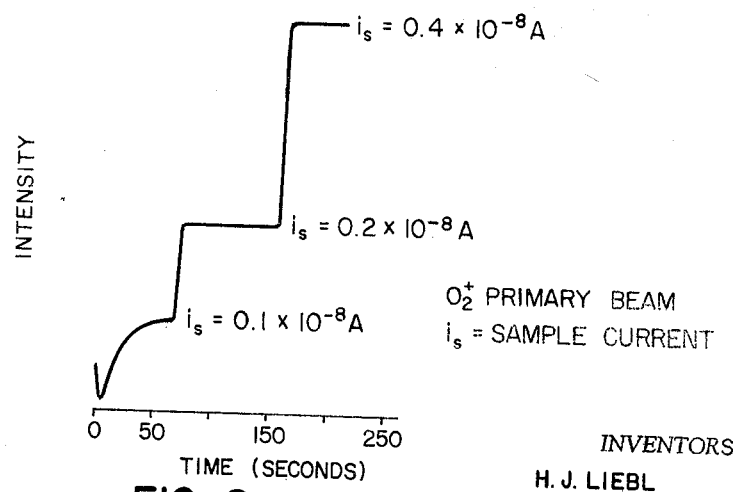
FIG. 2
INVENTORS
H. J. LIEBL
C. A. ANDERSEN
BY
ATTORNEY

304 STAINLESS STEEL SPECIMEN
MASS 52 (Cr)

304 STAINLESS STEEL SPECIMEN
MASS 56 (Fe)

(INTENSITY SCALE IS 5×SCALE OF FIG'S. 3A & 3B)

304 STAINLESS STEEL SPECIMEN
MASS 58 (Ni)

(INTENSITY SCALE IS 100 x SCALE OF FIG'S. 3A & 3B)

A⁺ PRIMARY BEAM
$i_s = 0.4 \times 10^{-8} A$ 0  25
TIME (SECONDS)

$O_2^+$ PRIMARY BEAM
$i_s = 0.4 \times 10^{-8} A$ 0  50  100
TIME (SECONDS)

304 STAINLESS STEEL SPECIMEN
MASS 28 (Si)

(INTENSITY SCALE IS 6 x SCALE OF FIG'S. 5A & 5B)

$O_2^+$ PRIMARY BEAM
$i_s = 0.45 \times 10^{-8} A$ 0  50  100
TIME (SECONDS)

INVENTORS
H. J. LIEBL
C. A. ANDERSEN

BY
ATTORNEY

April 21, 1970   C. A. ANDERSEN ET AL   3,508,045
ANALYSIS BY BOMBARDMENT WITH CHEMICALLY REACTIVE IONS
Filed July 12, 1968   4 Sheets-Sheet 4

INVENTORS
C. A. ANDERSEN
H. J. LIEBL

BY *Hoffman Stone*
ATTORNEY

United States Patent Office 3,508,045
Patented Apr. 21, 1970

3,508,045
ANALYSIS BY BOMBARDMENT WITH
CHEMICALLY REACTIVE IONS
Christian A. Andersen, Solvang, Calif., and Helmut J.
Liebl, Munich, Germany, assignors to Applied Research Laboratories, Inc., Sunland, Calif., a corporation of Delaware
Continuation-in-part of application Ser. No. 678,840,
Oct. 30, 1967. This application July 12, 1968, Ser.
No. 753,822
Int. Cl. H01j 39/34, 37/26
U.S. Cl. 250—41.9                              5 Claims

ABSTRACT OF THE DISCLOSURE

Electronegative ions, especially those of the halogens, are used in an ion beam to bombard a specimen for chemical analysis by spectrometric analysis of secondary ions sputtered from the specimen in response to the bombardment.

BRIEF SUMMARY OF THE INVENTION

This application is a continuation-in-part of our copending application, Ser. No. 678,840, filed Oct. 30, 1967, now abandoned.

This invention relates to a novel method of chemical analysis by bombarding a material to be analyzed with ions to cause the emission of sputtered, or secondary ions, from the surface of the material, which secondary ions may be analyzed to produce a highly sensitive indication of the composition of the material.

Chemical analysis by ion bombardment is well known and has recently been the object of investigation on an international scale. Heretofore, the bombarding beam has been constituted by ions of a chemically inert gas, such as argon, and the usual practice has been to maintain the specimen in a hard vacuum and as free from contaminating influences as possible.

Under these circumstances, difficulties of major concern have been encountered having to do primarily with sensitivity and stability. It was found that only a small fraction of the sputtered material was in the form of ions available for analysis so that the desired degree of sensitivity could not be achieved. Also, as the bombardment continued, the fraction of the sputtered particles that carried electric charges became progressively smaller and the output signal continuously declined, so that in many cases it was extremely difficult, if not impossible to calibrate the output signals of ion bombardment instruments. They were not stable with respect to time.

The foregoing difficulties were partly overcome by previous suggestions to introduce a reactive gas into the chamber wherein the bombardment was carried out, to contact and to react with the specimen. But this procedure encounters serious limitations and undesirable side effects. For example, to maintain stability, a relatively high concentration of the reactive gas must be maintained at the sample surface to ensure that the particular surface atoms struck by the bombarding ions have been previously contacted by the reactive gas. There must be a balance between the partial pressure of the reactive gas in the chamber and the current density in the bombarding beam such that the arrival rate of the reactive gas exceeds by a factor of at least ten the arrival rate of the bombarding ions per unit area of the sample. This imposes a severe limitation on the magnitude of the current in the bombarding beam, because there is a practical upper limit of about $10^{-4}$ torr on the pressure of the reactive gas that can be tolerated in the chamber without adversely affecting the intensity and focussing of the bombarding beam and imaging of the sputtered ions through the secondary ion optics. Analysis shows that in this approach, the current density in the bombarding ion beam is limited as a practical matter to a maximum of $6.4 \times 10^{-4}$ ampere per square centimeter, which is a value 100 times less than the current densities achievable when bombarding in a hard vacuum. Therefore, even though the proportion is increased of the sputtered particles that are in the form of ions, the total number of ions produced is very small because the bombarding beam current must be severely restricted and the total number of sputttered particles is small.

Briefly, in accordance with the present invention, it has now been found that an increase in sensitivity and a high degree of stability of output signal may be achieved, and the foregoing described disadvantages and limitations to a large extent overcome if the bombarding beam includes chemically reactive ions, preferably to the substantially complete exclusion of all other ions.

The preferred ions are those of elements that are highly electronegative, of relatively large mass, and capable of forming strong chemisorption bonds with the material under bombardment. Carbon, nitrogen oxygen, and especially the halogens are all highly effective. Iodine ions are the presently preferred ions because of their relatively large mass, high reactivity, and ready availability.

The theory upon which the practice of the invention is based is not definitely understood. When the specimen is initially bombarded by the ion beam in the practice of the invention, there is a brief period of instability during which the output signal usually declines sharply and then recovers to an equilibrium value. The period is typically one to two minutes in duration, after which the output of secondary ions remains constant to a high degree, varying only in accordance with variations in the intensity of bombardment. It is presently thought that the effect is related to the chemical condition of the first few layers of atoms on the surface of the specimen material and to the work function of the specimen. Data and theory to these effects are discussed by M. Kaminsky in Atomic and Ionic Impact Phenomena on Metal Surfaces, Academic Press, New York, 1965, pp. 201 et seq., and by J. M. Schroeer in a doctorate thesis at Cornell University, 1964, entitled Surface Ionization of Sputtered Atoms.

It is thought that in the practice of the invention, the bombarding ions react with the bombarded material to increase the work function of the bombarded surface, with the result that the surface has an enhanced tendency to withhold electrons from the sputtered ions as they are driven from the surface by the impinging primary ions. Increase of the work function also tends to improve the survival rate of the sputtered positive ions, because a greater electrostatic force is required to draw electrons from the surface to neutralize the ions. The effect is most pronounced for analyses that are electropositive in character, that is, for those in the first four groups of the periodic table of the elements, because these elements accept positive charges more readily than do the electronegative elements.

The practice of the invention may be carried out on any type of ion bombardment equipment, which at the present time fall in two main categories. First, there is the type that may be called the secondary ion microscope, in which a relatively large area of the surface of the specimen is bombarded, and discrimination as to the compositions of different incremental area portions of the surface is accomplished by an appropriate arrangement of the mass spectrometer to produce a magnified ionic image of the surface. Second, there is the ion microprobe, in which the bombarding beam is focused upon a relatively small surface portion of the specimen, typically of about one to about five microns in diameter, as illustrated in the copending application of Helmut Liebl entitled Ion Microprobe, Ser. No. 494,388, filed Oct. 11, 1965 assigned to the present assignee. This latter type of bombardment equipment is thought, at least in the present state of the art to be more versatile and to have better sensitivity than the former type, and was used in the reduction to practice of the present invention.

One important advantage of the particular ion microprobe disclosed and claimed in the hereinabove identified co-pending application is the inclusion of a magnetic sector lens in the path of the primary ions, which enables the selection of a single kind of ion for the bombarding beam, and the substantially complete elimination of undesired, or impurity ions from the beam. Thus, the material from which the reactive ions are drawn may be introduced into the ion source entrained in an inert carrier gas such as, for example, nitrogen or argon, thereby enabling control of corrosive effects to within acceptable limits. The output of the ion source in such case is a mixture of major proportions of the inert carrier and lesser proportions of the reactive ions, along with some impurity ions. All of the ions other than the desired reactive ions are then effectively deflected out of the beam, and only the desired ions are directed to the material to be bombarded.

For optimum results, it is also important that the ion source be capable of producing a very intense output of ions. Best results so far have been achieved using a duoplasmatron source of the type having a hollow cathode, setting the output aperture of the source slightly out of alignment from the median axis of the plasma arc, and providing electrical bias to extract negative ions. With this arrangement, as described in greater detail hereinafter, the reactive ions can be produced in large numbers, adequate to provide heretofore unattainable analytical sensitivity and stability.

DETAILED DESCRIPTION

Representative embodiments of the invention will now be described in detail in conjunction with the accompanying drawings wherein:

FIGURE 1A is a chart showing the output signal as a function of time of a secondary ion analyzer indicating the sputtering of aluminum ions (mass 27) from a specimen of relatively pure aluminum responsively to bombardment by a beam of argon ions;

FIGURE 1B is a chart generally similar to the chart of FIGURE 1A, except that it indicates the sputtering of aluminum ions from the same specimen material responsively to bombardment by molecular oxygen ions ($O_2^+$);

FIGURE 2 is a chart showing the output signal as a function of time of a secondary ion analyzer indicating the sputtering of zinc ions from a specimen of relatively pure zinc responsively to bombardment by a beam of oxygen ions, and showing variations in the output signal effected by changes in the current in the bombarding beam;

Figure 5A:
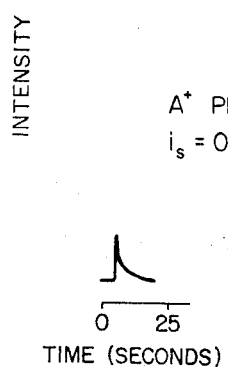
FIGURE 5A is a chart illustrating the output of secondary nickel ions from the same stainless steel sample in response to bombardment by a beam of argon ions.
Figure 5B:
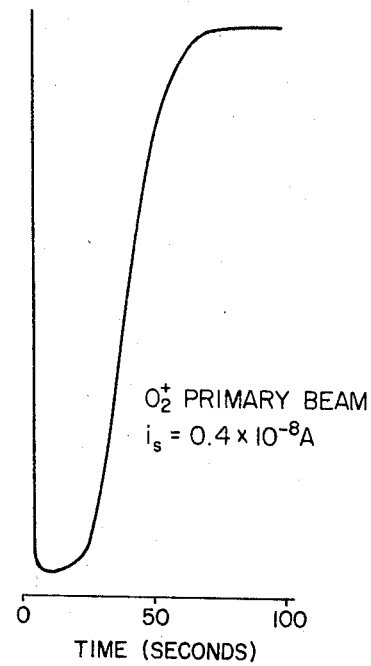
Figure 6:
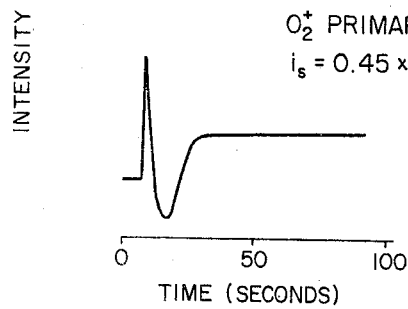
Figure 8:
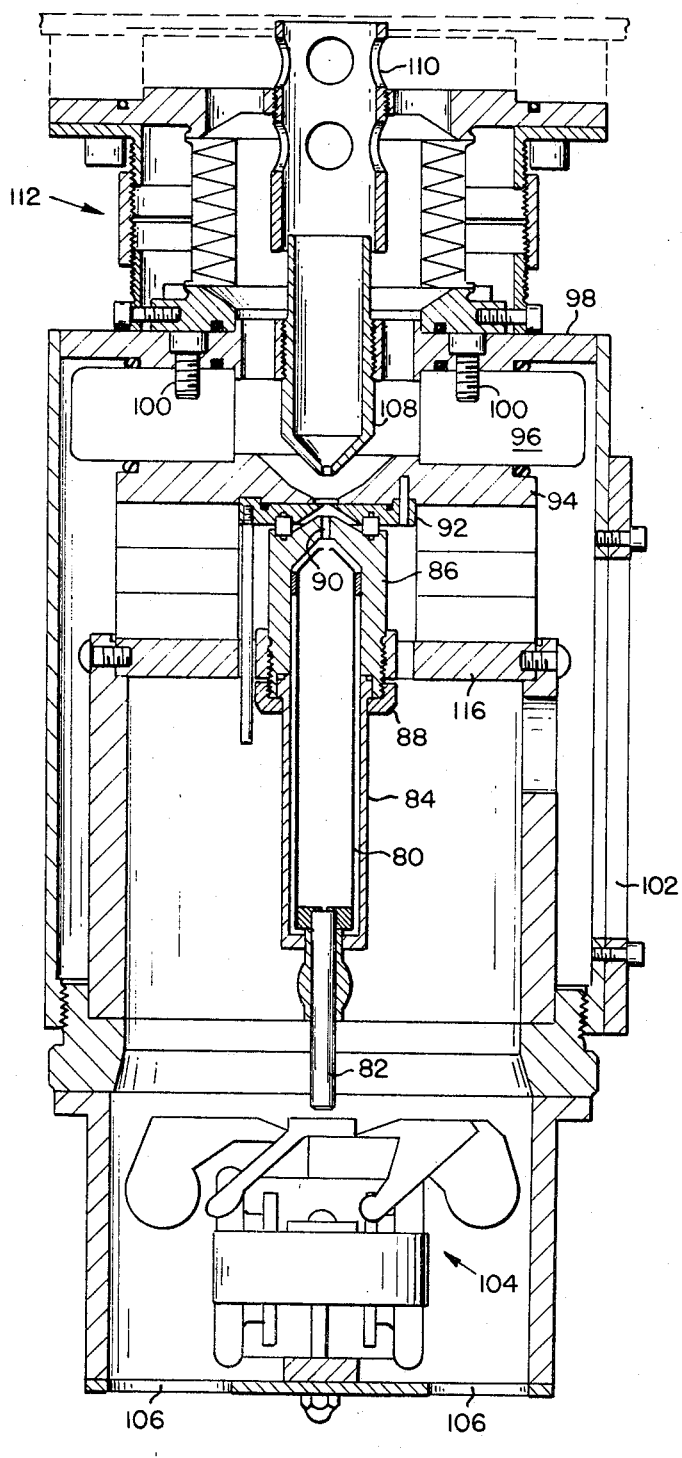
Figure 7:
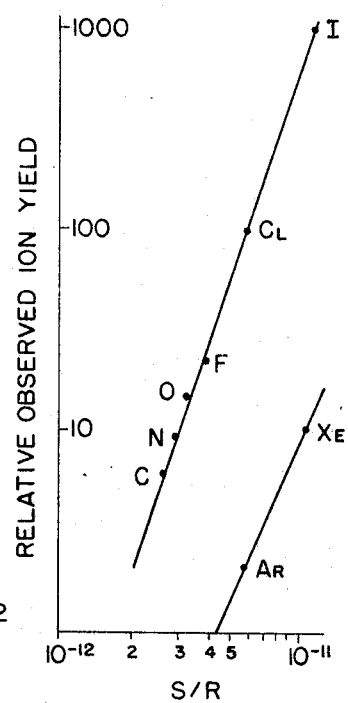

FIGURE 5B also illustrates the output of secondary nickel ions from the same stainless steel sample, but this time in response to bombardment by a beam of oxygen ions;

FIGURE 6 is a chart showing the output of secondary silicon ions from the same stainless steel sample responsive to bombardment by a beam of oxygen ions;

FIGURE 7 is a chart illustrating the relative outputs of positive aluminum ions from an aluminum surface responsively to bombardment by ions of several different elements; and FIGURE 8 is a partly schematic longitudinal sectional view of a duoplasmatron ion source device of the kind presently preferred for use in the practice of the invention.

In all the hereinafter described examples of the practice of the invention, an ion microprobe of the kind described and claimed in the hereinabove identified co-pending application of Helmut J. Liebl was used. The bombarding beam was de-focused to cover an area of about twenty square microns to avoid the effects of localized variations in composition of the specimen.

FIGURE 1A illustrates the variation of the output signal of the microprobe as a function of time for aluminum ions sputtered from a specimen of relatively pure aluminum in response to bombardment by a beam constituted solely of chemically inert ions, typically argon. At the beginning of the bombardment, on a previously unsputtered spot, the output signal begins at a low value, and rapidly climbs to a peak. This initial low output and subsequent increase is thought to be due to the removal by the ion beam of a very thin, probably monomolecular film of hydrocarbon material or water pre-existing on the surface of the specimen. After rising to the peak value, the output then declines approximately in accordance with an exponential curve to a relatively low value.

From this curve, it is readily seen that the problem of making quantitative analyses by ion bombardment using a beam of argon ions is not simple. The value of the output signal is highly time dependent, and, as time progresses, often becomes so small that its accuracy and usefulness becomes questionable.

When, however, the specimen is bombarded with a beam of oxygen ions, either atomic, $O^+$, or molecular, $O_2^+$, the output signal quickly reaches a stable, relatively high value enabling a repeatable, accurate, quantitative analysis, as illustrated by the curve shown in FIGURE 1B. Due to effects that are not at present fully understood, there is an initial period of fluctuation in the output signal lasting approximately up to a minute or so following the start of bombardment. Thereafter, an equilibrium condition is reached, and the output signal remains stable at a relatively high value fairly close to the initial peak value obtained both in the prior procedures and in the new. Moreover, the value is a linear function of the current through the specimen during bombardment, which closely approximates the current in the bombarding beam. This is shown in the chart of FIGURE 2, which indicates the emission of zinc ions from a specimen of relatively pure zinc in response to bombardment by a beam of $O_2^+$ ions at different successive current densities in the beam. Once the equilibrium condition is established, the secondary emission is thereafter closely proportional to the beam current.

Figure 3A:
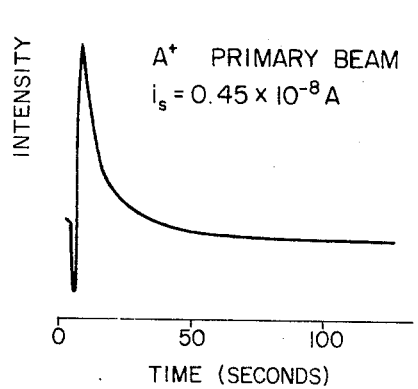
FIGURE 3A is a chart generally similar to the charts of FIGURES 1A and 1B indicating the output of secondary chromium ions from a sample of stainless steel in response to bombardment by a beam of argon ions.
Figure 3B:
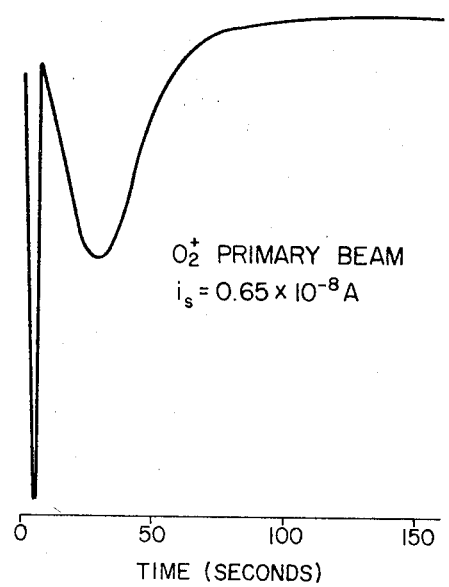
FIGURE 3B is a chart indicating the output of chromium ions from the same stainless steel sample as used to produce the chart of FIGURE 3A, but in response to a beam of oxygen ions.

FIGURES 3A and 3B illustrate the improvement achieved in the practice of the invention when analyzing for chromium (mass 52) in 304 stainless steel. The approximate composition of 304 stainless steel is 19% chromium, 68% iron, 10% nickel, and 1% silicon by weight, corresponding in atomic percent to approximately 19.9% chromium, 66.8% iron, 9.3% nickel and 2% silicon. As seen in FIGURE 3A, when a previously unsputtered spot on the stainless steel specimen is bombarded with a beam of argon ions, the yield of sputtered chromium ions starts at a low value, and increases sharply to a peak value from which it decays in approximately an exponential fashion to a steady state value relatively close to the initial yield. This value is, however, still relatively small as compared to the detection capabilities of the equipment. By contrast, as shown in FIGURE 3B, when the stainless steel specimen is bombarded with a beam of oxygen ions, the yield of secondary chromium ions first fluctuates for an initial interval of approximately one to two minutes, after which it becomes highly stable at a relatively high value.

Figure 4A:
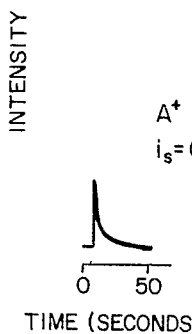
FIGURE 4A is a chart indicating the output of iron ions from the same stainless steel sample as used to produce the charts of FIGURES 3A and 3B emitted in response to bombardment by a beam of argon ions.
Figure 4B:
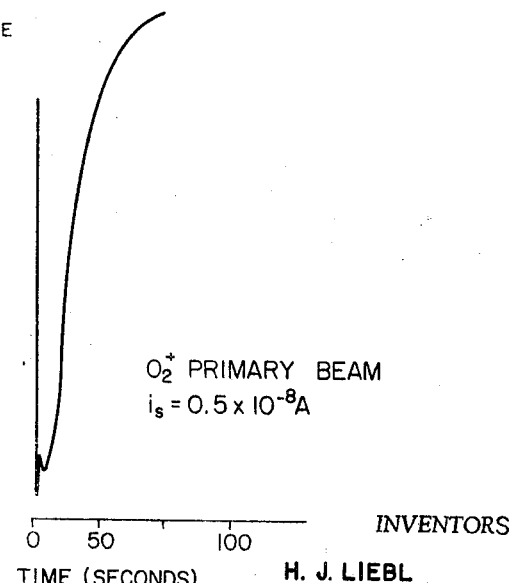
FIGURE 4B is a chart showing the output of secondary iron ions from the same stainless steel sample under bombardment this time by a beam of oxygen ions.

All of the charts in the drawings are drawn to scale for ease of comparison. The abscissa scales are indicated in terms of seconds, while the ordinates are not calibrated, because their values depend on the gain of the amplifier and the characteristics of the particular mass spectrometer used in the equipment. The ordinates in the various different figures differ in scale in accordance with differences between the abscissa scales, and as noted by appropriate legends. For example, the abscissa scale in FIGURES 4A and 4B is one half the scale in FIGURES 3A and 3B, and the ordinate scales are similarly proportioned. If the curves of FIGURES 4A and 4B were to be plotted on the scale of FIGURES 3A and 3B, they would become twice as large in both coordinate directions. Typically, the actual ion currents entering the mass spectrometer from the bombarded specimen are on the order of micro-microamperes, and the gain of the output amplifier is on the order of about $10^6$. The curve in FIGURE 3B, for example, may be thought of as indicating a maximum value of a few tens of micro-microamperes of ions entering the mass spectrometer, and a few tens of microamperes at the output of the amplifier. Typical bombarding beam currents are indicated in terms of the current through the specimen, and are in the order of $10^{-10}$ to $10^{-8}$ amperes in the equipment used. Accelerating fields for the bombarding beams are, typically, on the order of ten kilovolts.

FIGURES 4A and 4B illustrate the comparison between the yields of iron (mass 56) ions from the same stainless steel specimen as used to produce the curves shown in FIGURES 3A and 3B, first in response to bombardment by argon ions, and then by oxygen ions. As shown in FIGURE 4A, when bombarding with argon ions, the yield of secondary iron ions rapidly falls off to practically a negligible value following an initial peak emission, whereas when the specimen is bombarded with oxygen ions, the emission of iron ions rises fairly rapidly to a very high and stable value.

Similarly, FIGURES 5A and 5B illustrate the secondary ion yield of nickel (mass 58) ions from the same stainless steel specimen. In FIGURE 5A, it is seen that the emission of nickel ions even at its peak initial value is relatively small and drops off very rapidly to an almost negligible value when the specimen is bombarded with a beam of argon ions. When the specimen is bombarded, however, with a beam of oxygen ions in accordance with the invention, the emission of nickel ions fairly rapidly approaches a very high and stable value.

FIGURE 6 illustrates the emission characteristic of silicon (mass 28) ions from the same stainless steel specimen in reponse to bombardment by an oxygen ion beam in accordance with the invention. Again, it is seen that the output of the secondary silicon ions, although much smaller than the output of ions of the major constituents of the specimen, rapidly teaches a relatively stable value enabling the repeatable, accurate, quantitative determination of silicon.

Generally similar results in respect of high ion yield ratios and stability of output signals have also been achieved by bombarding specimens of many different elements with beams of reactive ions. Representative targets were titanium, silicon, magnesium, iron, silver, molybdenum, carbon, tungsten, zinc, tantalum, zirconium, manganese, chromium, tin, lead, bismuth, nickel, and copper.

The primary ions were those of carbon, nitrogen, oxygen, fluorine, chlorine, iodine, argon, and xenon. In all cases, bombardment with ions of a chemically reactive, electronegative element provided a much greater yield of positive secondary ions than bombardment with ions of the inert gases. The empirical results were consistent with the following theory.

Positive secondary ions are generated in the collisions between the primary ions and the atoms of the target, during which the kinetic energy of the primary ions is transferred to the atoms of the target. A portion of the energy is transferred elastically, and, in the case of any one collision, may result in the ejection of an atom of the target material from the bombarded surface. Another portion of the energy is transferred inelastically, and is consumed in the excitation of the electrons of atoms of the target, in some cases causing an atom to lose an electron and become a positive ion.

To obtain the maximum yield of positive secondary ions it is, therefore, necessary to optimize the relationship between the elastic and the inelastic transfers of energy.

The yield of sputtered particles can be understood in terms of a model and theory proposed by P. K. Rol et al. in an article in Physica, volume 26, pp. 1009–1011 (1960) and modified by O. Almen et al. in an article in the technical journal Nuclear Instrumentation and Methods, volume 11, pp. 279–289 (1961). In general, in accordance with the modified theory, the yield of sputtered particles increases with the atomic mass of the primary ions and with their energies. For primary ions of a given mass, the yield of secondary particles of a given mass will increase as the energy of the primary ions is increased up to a certain point, and will then decrease from the maximum level as the energy of the primary ions is increased further. The pertinent values can be predicted with satisfactory accuracy by the theory.

The inelastic energy loss is related to the distance of closest approach of the primary ions to the atoms of the target to which they transfer their energy. The loss is large for a close approach, and small for a far one. The distance of closest approach can be predicted by the theory presented by P. K. Rol et al. In general, the distance of closest approach decreases as the energy of the primary ions increases. The generation of positive ions is, thus, directly related to the sputtering yield, and universally related to the distance of closest approach.

In addition to generating the ions, however, it is also important to ensure their survival as ions as they leave the surface of the target. This depends on the ability of the ions to pick up electrons at the surface. If the electron yield of the surface is high, there is a high probability that the ions will be neutralized as they leave the surface. The electron yield of the surface is determined by its chemistry. If the surface is composed of strongly bonded compounds, its electron yield is low, and it is said to have a high work function. To achieve a high survival rate, the surface of the target should have a high work function.

An important aspect of the present invention is the discovery that the work function of any target can be maintained at a high value by proper selection of the primary ions, particularly the use of ions of chemically reactive, electronegative elements.

By contrast, primary ions of the inert gases, as used in accordance with previous practice, lower the work function of the surface of the target, and tend to diminish the yield of secondary ions. See, for example, an article by J. A. Dillon et al. at pp. 471–474 of the Transactions of the National Vacuum Symposium (MacMillan Pub., 1963).

The difficulties encountered when using an inert gas such as argon for the bombarding ionic beam may also be explained in terms of the cleaning effect of the bombarding beam upon the surface of the specimen. As the bombardment progresses, the adsorbed reactive gases are removed and successive surface layers are cleaned off by the sputtering action of the beam. As the bombarded area becomes cleaner, the ion yield becomes progressively smaller. The degree of cleaning produced by the bombarding beam depends upon the primary ion current density and the partial pressures of reactive gases above the surface of the specimen. The results suggest that if it were possible to reduce the pressures of the reactive gases sufficiently, substantially all of the sputtered material would become non-ionic. The effect is seen each time the bombarding beam is moved to a new surface area on the specimen. Each time a new area is bombarded, a relatively high secondary ion yield is initially noted, and the yield deteriorates with time. The rate of deterioration is dependent on the current density of the bombarding beam, and the final secondary ion yield is dependent on both the current density and the gas pressure in the bombarding chamber. Pre-cleaning the specimen to alleviate the problem of a continuously changing output is not a practical solution, because of the very rapid rate at which the specimen becomes re-contaminated, even in a good vacuum. For example, with a typical metallic specimen, a reactive gas such as oxygen will be adsorbed at the surface at the rate of about one atomic monolayer per second at $10^{-6}$ torr.

Adsorbed gases are known to react chemically with surface layers of metals by a process known as chemisorption to produce compounds in accordance with the chemical natures of the gases and the metals. See, for example, an article by B. M. W. Trapnell in the Proceedings of the Royal Society, A218, 566 (1953). The elements that have been found to be effective in the practice of the invention are all reactive and readily chemisorbed by most materials. They are present as separate particles in the ion beam, and accordingly, act as gases. It is thought that the increased ion yield ratios produced in the practice of the present invention are direct results of a large population of ions existing in the compounds formed at the surface of the target.

Returning now to the basic theory, to maximize the sensitivity of analysis, it is necessary to take into account both the generation and the survival of the secondary ions. To generate the maximum number of secondary ions, the mass of the primary ions should be as large as possible. To enhance survival, the primary ions should be those of the electronegative gases, which are capable of maintaining the work function of the target at a high value.

These conclusions have been confirmed for a large number of cases, of which the examples charted in FIGURE 7 are illustrative. FIGURE 7 shows the relative yields of positive secondary aluminum ions from an aluminum target in response to bombardment by various different primary ions. Each point represents results of bombardment at various different accelerating voltages throughout the so-called hard collision range.

Both axes of the chart of FIGURE 7 are on logarithmic scales. The ordinate is in terms simply of the yields of secondary ions relative to an arbitrarily chosen reference number. The abscissa is in terms of the quantity $S/R$ as calculated from the relationships given by O. Almen et al., and P. K. Rol et al., for S and for R, respectively, and indicates the number of sputtered particles per primary ion, divided by the distance of closest approach. This unit enables automatic compensation for differences in accelerating voltages throughout the useful range.

O. Almen et al. show that:

$$S = 4.24 \times 10^{-10} \times \frac{n_0 R^2 E M_1 M_2}{(M_1 + M_2)} \exp\left(-10.4 + \frac{\sqrt{M_1} E_b}{M_1 + M_2}\right)$$

where:
$n_0$ is the number of atoms per cubic meter in the surface layers of the target,
R is the distance of closest approach,
E is the energy of the primary ions, in electron volts,
$M_1$ is the mass of the primary ions,
$M_2$ is the mass of the atoms of the target,
$E_b$ is the binding energy of the atoms of the target, and all dimensions are in the MKS system.

P. K. Rol et al. show that:

$$R = \frac{a_0}{(Z_1^{2/3} + Z_2^{2/3})^{1/2}} \ln \frac{Z_1 Z_2 e M_1 M_2}{4\pi \epsilon_0 R E M_2}$$

where:
$Z_1$ is the atomic number of the primary ions,
$Z_2$ is the atomic number of the secondary ions,
$a_0$ is the radius of the first electron orbit in the hydrogen atom,
$e$ is the charge of an electron,
$\epsilon$ is the dielectric constant for a vacuum, and
all other symbols and dimensions are the same as in the expression for S.

For any given value of $S/R$, the yield of secondary ions is seen to be greater by a factor of one hundred or more when the primary ions are those of the reactive, electronegative ions than when they are ions of the inert gases. This difference demonstrates the importance of maintaining a high survival probability. Generally similar relationships have been empirically found to exist for all of the various target materials studied, which, as hereinabove listed, include a large sampling of the elements.

It can be seen from the chart that the best results are achievable by the use of iodine ions. There are no elements of maximum electronegativity available that have higher atomic mass than iodine. Iodine is also readily available, inexpensive, and easy to handle under vacuum conditions. Iodine ions are, therefore, the preferred primary ions for use in the practice of the invention.

It is preferable to use a purified beam of the chemically reactive ions to avoid the complication of producing layers of mixed or patchy construction, or surfaces wherein the work function varies among the various different incremental portions, or both, thereby to achieve maximum uniformity of response.

In the practice of the invention it is believed that the bombarding beams of reactive ions react with the surfaces of the specimens to produce surface layers of chemical compounds from which the desired elemental ions are sputtered. The surface layers are constantly destroyed by the sputtering and re-constituted by the reactions. The process, once stability has been achieved, appears to be independent of current density in the bombarding beam, probably because a chemically stable metallic compound is formed.

Referring again to the drawings, and particularly to FIGURES 3A-5B, it is seen that the improvement in sensitivity achieved in the practice of the invention, as compared to the sensitivity obtained using inert ions increases in the order of chromium, iron, nickel. That is, a greater improvement in sensitivity is achieved for iron than for chromium, and a further improvement is achieved for nickel. When compared one against the other for their absolute detection sensitivities, however, it is seen that when bombarding with oxygen ions, the highest sensitivity is achieved for the secondary chromium ions, a somewhat lower sensitivity for iron, and a lower sensitivity yet for nickel. This behavior can be partially understood in light of the relative chemisorption activities of the different elements for oxygen.

It is also observed that the preliminary emissions of the various secondary ions in response to the bombardment by oxygen ions prior to the attainment of the stable condition are quite different for the various different elements. The chromium curve has a peak about equal in value to its value in the final, stable condition. The curve showing the emission of iron ions has a very small peak, and that for the emission of nickel ions, no discernible peak. The peaks represent conditions of high efficiency in ion production. It is thought likely that they are caused by original oxide layers existing on the surface of the specimen. The initial falling off in each curve indicates the rapid removal of the original layers, which is largely completed before the chemisorption process gets well started. Once the bombarding ions penetrate and diffuse through the surface layers of the specimen, a dynamic equilibrium is established in which an oxide layer is produced at the same rate at which it is destroyed by the bombardment. The time required to attain this equilibrium appears to be dependent on the current density of the primary ion beam, and accounts for the time from the first ion output to the attainment of the stable condition. It is thought that the attainment of the dynamic equilibrium probably involves the production of the oxide in substantial depth on an atomic scale in the specimen, because it is known that the bombarding ions are injected some tens of atomic layers into the crystal lattice of the specimen for ten kilovolt ion beams.

It is presently believed, on the basis of this theory, that the relatively high initial output of chromium ions indicates that practically all of the chromium atoms on the surface of the stainless steel specimen are initially oxidized, and the relatively low initial outputs for iron and nickel indicate that few iron atoms, and only very few, or almost none of the nickel atoms are normally oxidized. This is in general agreement with the reactivity of these elements to chemisorption of oxygen as previously reported by other researchers, and with the known resistance to oxidation of stainless steel. The very high initial output of silicon ions is not understood, but is thought possibly to be due to some type of peculiar surface oxide of silicon.

The relative difference in detection sensitivity as between beams of inert ions and oxygen ions for bombarding the materials can be ascribed to the same theoretical mechanism. Nickel on the surface of stainless steel is oxidized with difficulty in the atmosphere. The normal number of nickel atoms originally oxidized is, therefore, small, with the result that there is only a small initial peak in the ion emission for nickel. The number of surface atoms re-oxidized by the arrival at the surface of oxygen ions from the residual gas within the instrument is also small, which results in a low final output when sputtering with argon ions. This creates a large difference in the final output of nickel ions when using oxygen ions in the bombarding beam, as compared with the output when using argon ions. Chromium, however, does not show the same degree of difference because it is more easily oxidized in the atmosphere and by the residual gas in the instrument. The effect is more readily appreciated if it is noted that the sputtered particles come mostly from the first one or two atomic layers of the surface of the specimen, the layers having maximum exposure to the atmosphere.

Part of the decreasing sensitivity noted in passing from chromium, to iron, to nickel, and to silicon, when bombarding with oxygen ions may be ascribable to the relative ion production efficiencies of the respective elements, which have been reported in the literature. These generally decrease in the same order as found in the practice of the invention, with the single exception of silicon, which has been reported to have about the same ionization efficiency as iron.

An ion source device presently preferred for use in the practice of the invention is shown in FIGURE 8. When using highly reactive primary ions, it is desirable to limit the concentration of the reactive element in the source device to relatively small values, and to dilute it with a relatively inert gas such as argon or nitrogen. Otherwise the reactive element may have highly undesirable corrosive effects on the source device and adversely affect its operation. For example, when iodine ions are generated it is preferred to limit the iodine content of the gas mixture fed to the source device to less than about 5%, the balance being nitrogen or argon. Under these circumstances, the source device must be capable of producing a very intense output because only a small proportion of its output consists of the desired ions of the reactive element. The duoplasmatron shown in FIGURE 8 is capable of producing an adequate output for the satisfactory practice of the invention.

The duoplasmatron comprises a tubular cathode 80 having electron emissive material on its inner wall. An inlet tube 82 is sealed to the cathode 80 at the rear, to the right as viewed in FIGURE 8, for the introduction of the gas mixture into the cathode. The cathode 80 is supported within a housing, which consists of a tubular member 84 at the rear and an intermediate baffle 86 at the front. The tubular member 84 is sealed to the baffle 86, and the two are secured together by a retainer nut 88.

The exit aperture 90 at the front of the baffle 86 is offset slightly from coaxial alignment with the cathode 80. During operation of the duoplasmatron, an electric arc is produced centered along the longitudinal central axis of the cathode 80. The arc is very hot, and is surrounded by cooler layers of gas. The highest concentrations of negative ions are found in the cooler layers, while the ions in the arc itself are found to be mostly positively charged. The electronegative elements can be ionized with negative charges more easily than with positive. Higher yields of negative than of positive ions can be produced. The aperture 90 is, therefore, offset from the axis of the cathode 80 to favor extraction of the negative ions.

The intermediate baffle 86 is sealed against, and electrically insulated from a centrally apertured anode plate 92, the aperture (not separately designated) of which is aligned with the axis of the cathode 80. The anode plate 92 is fixed upon an iron plate 94, which is seated upon an insulating positioning flange 96. The positioning flange 96 is secured to the front wall 98 of the outer housing by screws 100.

The outer housing is open to the ambient atmosphere through a port 102, and dynamic cooling is provided by a fan 104, which draws air in through the port 102 and exhausts it through vents 106 in the rear wall of the housing.

A tubular acceleration electrode 108 is fixed through the front wall 98 of the housing in coaxial alignment with the cathode 80 and the anode 92. A shielding tube 110 is supported, forward of and overlapping the accelerating electrode 108, upon a bellows assembly 112, by which it may be adjusted in position axially, as indicated by the dashed lines.

In operation, the outer housing is preferably grounded, and the "hot" accelerating voltage applied to the cathode 80. The plasma arc is also subjected to a magnetic field between the intermediate baffle 86 and the anode 92 to pinch the discharge and maximize its brightness along the axis. The field is produced by annular ceramic permanent magnets 114 mounted between the iron plate 94 and an auxiliary iron plate 116, which is tightly fitted around the baffle 86 rearwardly from the plate 94. The magnets 114 are polarized axially, and the baffle 86 and the anode 92 act as pole pieces to define a magnetic gap through which the emerging ions pass.

What is claimed is:
1. Method of chemical analysis by bombarding a material to be analyzed with a beam of primary ions to sputter atoms of the material from its surface as secondary ions, and mass spectrometrically analyzing the secondary ions characterized in that the primary ions are ions of a chemically reactive element.
2. Method of chemical analysis by bombarding a material to be analyzed with a beam of primary ions to sputter atoms of the material from its surface as secondary ions, and mass spectrometrically analyzing the secondary ions characterized in that the primary ions are ions of a chemically reactive electronegative element.

3. Method of chemical analysis by bombarding a material to be analyzed with a beam of primary ions to sputter atoms of the material from its surface as secondary ions, and mass spectrometrically analyzing the secondary ions characterized in that the primary ions are ions of an element selected from the group consisting of carbon, nitrogen, oxygen, fluorine, chlorine, and iodine.

4. Method of chemical analysis by bombarding a material to be analyzed with a beam of primary ions to sputter atoms of the material from its surface as secondary ions, and mass spectrometrically analyzing the secondary ions characterized in that the primary ions are ions of iodine.

5. Method according to any of claims 1, 2, 3, and 4 including the step of purifying the primary beam so that only ions of a single selected element bombard the material to be analyzed.

References Cited

UNITED STATES PATENTS 2,947,868  8/1960  Herzog.
2,976,413  3/1961  Robinson.
3,415,985  12/1968  Castaing et al.

OTHER REFERENCES

The Journal of Chemical Physics, vol. 32, No. 5, Gronlund et al., May 1960, pp. 1540–1545.

1960 Vacuum Symposium Transactions, Stuart et al., Pergamon Press (1961), pp. 290–292.

RALPH G. NILSON, Primary Examiner

A. L. BIRCH, Assistant Examiner

U.S. Cl. X.R.

250—49.5